US012542119B2

(12) United States Patent
Fairbairn

(10) Patent No.: US 12,542,119 B2
(45) Date of Patent: Feb. 3, 2026

(54) EQUILIBRIUM PISTON VALVE FOR BRASS INSTRUMENTS

(71) Applicant: Kevin Toksöz Fairbairn, Newton, MA (US)

(72) Inventor: Kevin Toksöz Fairbairn, Newton, MA (US)

( * ) Notice: Subject to any disclaimer, the term of this patent is extended or adjusted under 35 U.S.C. 154(b) by 310 days.

(21) Appl. No.: 18/337,663

(22) Filed: Jun. 20, 2023

(65) Prior Publication Data

US 2023/0419926 A1 Dec. 28, 2023

Related U.S. Application Data

(60) Provisional application No. 63/355,824, filed on Jun. 27, 2022.

(51) Int. Cl.
*G10D 9/04* (2020.01)

(52) U.S. Cl.
CPC .................................... *G10D 9/04* (2013.01)

(58) Field of Classification Search
CPC .. G10D 9/04; G10D 7/10; G10D 9/00; G10D 7/00
See application file for complete search history.

(56) References Cited

U.S. PATENT DOCUMENTS

| | | | | |
|---|---|---|---|---|
| 249,012 | A | 11/1881 | Conn | |
| 3,881,388 | A | 5/1975 | McCracken | |
| 4,469,002 | A | 9/1984 | Thayer | |
| 2019/0189092 | A1 * | 6/2019 | Clissold .................. | G10D 7/10 |

* cited by examiner

*Primary Examiner* — Kimberly R Lockett
(74) *Attorney, Agent, or Firm* — Joseph D. Hodler

(57) ABSTRACT

An improved piston valve for brass instruments facilitates adding a length of tube for playing in a lower range, while minimizing the overall air resistance as well as the air resistance differential between disengaged and engaged positions. The piston casing accommodates two input tubes on one side and two output tubes at the same level on the other side. The piston cylinder is comprised of one air passage in one position, and two parallel air passages in a second position. The second position utilizes the attachment of additional tubing for a lower range.

12 Claims, 9 Drawing Sheets

EQUILIBRIUM PISTON VALVE FOR BRASS INSTRUMENTS

CROSS-REFERENCE TO RELATED APPLICATIONS

The present application is a Non-Provisional Applications which claims the benefit of Provisional Patent Application No. 63/355,824, filed Jun. 27, 2022.

FIELD

The present disclosure generally relates to a musical instrument valve, and more specifically, a valve attaching a length of tubing to a trombone.

BACKGROUND

The pitch of a brass instrument is determined by its length of tubing. The longer the tubing, the lower the resonant frequency. Musicians can adjust their lip tension and air flow to play notes within the harmonic of the resonant frequency.

For example, a tuba may have sixteen feet of tubing and a pitch of Bb1, a trombone may have eight feet of tubing and a pitch of Bb2 (one octave higher), and a trumpet may have four feet of tubing and a pitch of Bb3.

In addition to lip tension, a musician can adjust the pitch with a slide or valve. A slide affords continuous adjustment of tube length and is embodied in a trombone. A valve is a mechanism for changing the path of air through alternate tubing to increase or decrease the overall length. For example, three Périnet-type valves are common on trumpets, euphoniums, and tubas, as well as many other brass instruments.

In addition to a slide, tenor and bass trombones may also include a valve to lower the resonant frequency. These valves often drop the pitch from a Bb2 to an F2, dropping down a fourth interval. These are called F-attachments. Other attachments are available, the E-attachment being the second most common.

Adding an attachment to a trombone permits the musician to play in a lower range and facilitates playing alternate slide positions. For example, it may be difficult, or impossible, to play some pieces using the $6^{th}$ and $7^{th}$ positions of the slide. With an attachment, those notes may be played in a more accessible range around the $1^{st}$ and $2^{nd}$ positions.

Past inventors have added valves to trombones. Charles Conn added Périnet valves in 1881 (U.S. Pat. No. 249,012). This trombone eliminated the slide entirely, and experienced temporary modest success. The valve attachments had several extreme bends and obstructed air flow, forcing the musician to increase effort when playing lower notes. The multiple valves and attachments also increased maintenance requirements.

George McCracken devised a trombone with a bifurcated valve in 1975 (U.S. Pat. No. 3,881,388). This valve has two chambers and two rotors directing air flow through the valve. The arrangement cuts down on extreme bends, called knuckles, in the tubing in and around the valve, channeling air through 120-degree angles. But this requires complicated mechanics.

Orla Thayer invented a trombone with a conical-shaped rotary valve in 1984 (U.S. Pat. No. 4,469,002). This is the most recent significant innovation in trombone valve attachments. The conical shape permits airflow through a 155-degree bend. But the conical design requires regular maintenance and has a limited life span.

Bends in tubing in and around the valve increases undesirable air resistance. This increases the effort required to achieve low-end pitches. Additionally, if the level of resistance changes significantly between the engaged and disengaged positions, the differential requires expert level technique to execute while maintaining high sound quality.

A new valve attaching a tube length, limiting overall air resistance, limiting air resistance differential between positions, and requiring minimal maintenance would benefit brass instrument musicians.

SUMMARY

Enclosed is an improved piston valve for brass instruments. When engaged, the valve extends the overall length of the sound path to lower the pitch. It effectively adds range without significantly increasing air resistance, providing a substantially equivalent air flow for ease of performance and clarity of sound at the lower range.

Instrument tubing runs from the mouthpiece to the bell. A piston valve along the main tubing adds an alternative route through an attachment, increasing the overall tube length.

A piston valve is a cylinder plug inside a hollow casing. The cylinder plug, the piston, is comprised of air passages allowing air to flow through. Air flows from the mouthpiece through tubing, through a valve port into the piston casing, through an air passage within the piston, out another valve port, and out through additional tubing towards the bell.

The piston is actuated between two positions within the hollow casing. When the valve is engaged, the piston slides through the casing. Air flow from tubing emanating from the mouthpiece is redirected through the piston to an attachment tube, back through the piston, and then out through tubing towards the bell. The attachment extends the overall length of the sound path and lowers the pitch.

The piston consists of three air passages. The main air passage is utilized during the disengaged position and permits air to flow straight through the valve along the main path from the mouthpiece through the slide, and out the bell.

When the valve is engaged, the main air passage moves away from the external tubing ports. The sound path instead utilizes two alternative air passages, which divert the sound path through the attachment tubing and back through the valve before sending it out towards the bell.

The four tubes entering and exiting the valve are arranged around the perimeter of the piston casing at the same level. The tubes entering the valve from the mouthpiece and the attachment have adjacent ports on the front side of the valve. The tubes exiting the valve, through the attachment and towards the bell, have adjacent ports on the rear side of the valve.

Placing the external tubes in this arrangement minimizes the degree of angles in the air passages. Because the bends in the air passages are minimized, air resistance is minimized. The force required to blow air through the sound path is substantially equal between the engaged and disengaged positions. Therefore, the valve is termed an Equilibrium Piston Valve ("EP Valve").

BRIEF DESCRIPTION OF THE DRAWINGS

These drawings depict only exemplary embodiments of the disclosure and are not limiting of its scope.

DETAILED DESCRIPTIONS

Enclosed is an improved piston valve for brass instruments. When engaged, the valve extends the overall length of the instrument sound path to lower the pitch. It effectively adds range to an instrument without significantly increasing air resistance, while providing a substantially equivalent air flow for ease of performance and clarity of sound at the lower range.

Figure 1:
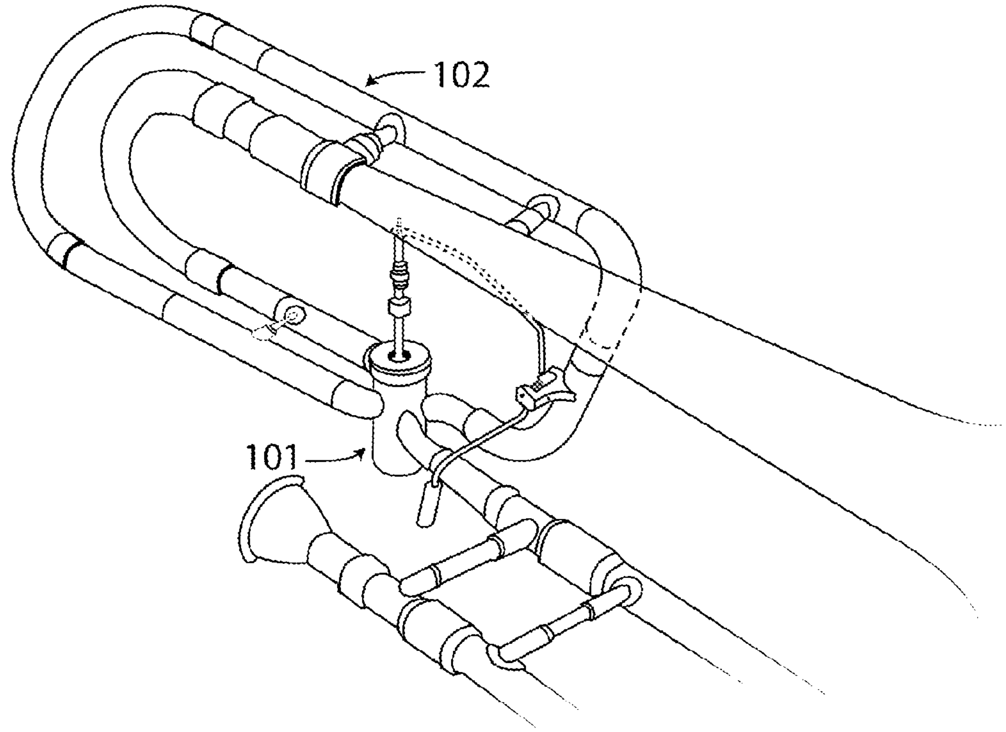
FIG. 1 is an isometric view of the posterior of a trombone with an equilibrium piston valve and additional tubing.

FIG. 1 shows one embodiment of an EP Valve in connection with a trombone. The valve 101 connects the tubing from the mouthpiece and slide to tubing extending out towards the bell. When engaged, the EP Valve connects an attachment 102 to increase the overall length of the sound path and lower the pitch. There are four tube connections with the valve, the mouthpiece/slide tube, the bell tube, the attachment-out tube, and the attachment-in tube. The attachment-out tube and the attachment-in tube are two ends of the attachment tube.

Figure 2:
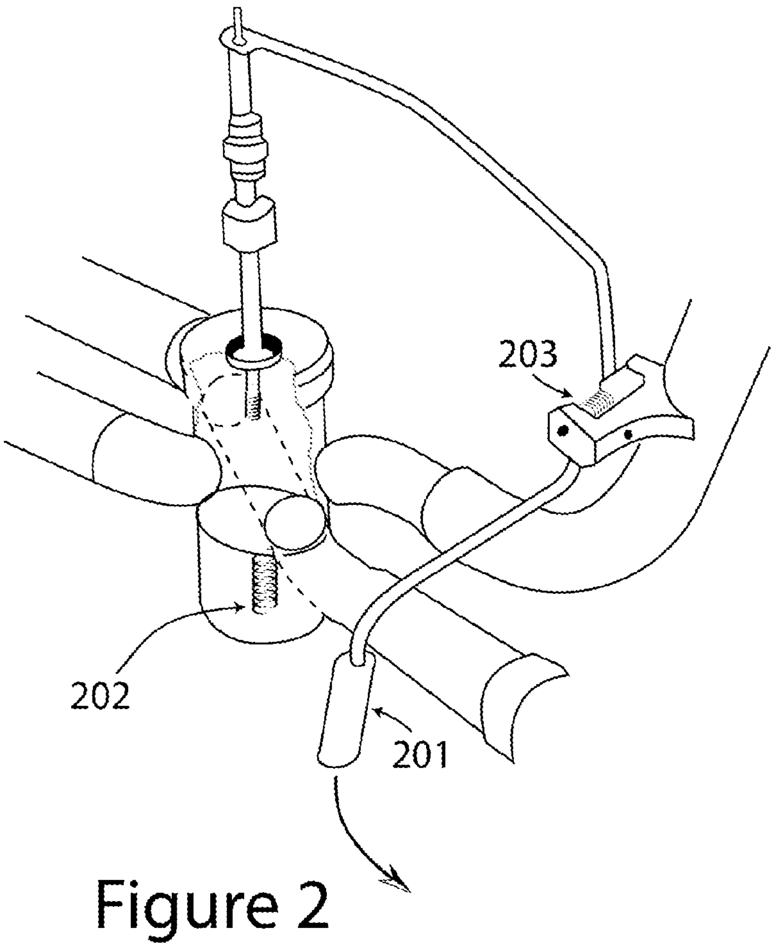
FIG. 2 is an isometric view of one embodiment of an equilibrium piston valve actuated by a thumb lever.

FIG. 2 shows a detail of one embodiment of an EP Valve. A lateral action thumb lever 201 is converted to vertical action to engage the valve. An internal return spring 202 between the lower valve cap and the piston secures the valve when disengaged. Likewise, a spring 203 on the lever bridge maintains the thumb lever in a disengaged position. When the thumb lever is pressed forward, the piston stem is lowered, moving the piston to the engaged position. When the thumb lever is released, the piston springs back into the disengaged position. Other mechanisms of actuation are envisioned.

Figure 3:
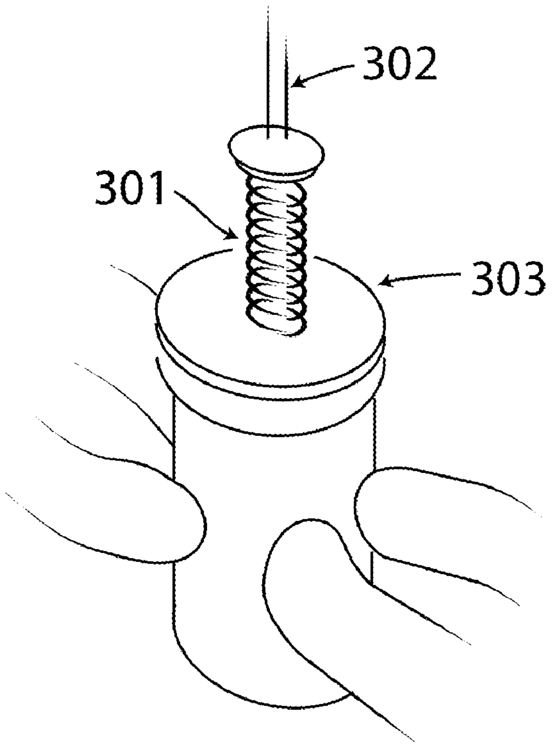
FIG. 3 is an isometric view of one embodiment of an equilibrium piston valve with an external spring.

FIG. 3 shows a detail of an alternative embodiment of an EP Valve. This valve has an external return spring 301 around the valve stem 302 above the upper valve cap 303. Other embodiments may utilize a finger button instead of a lever for actuation.

Figure 4:
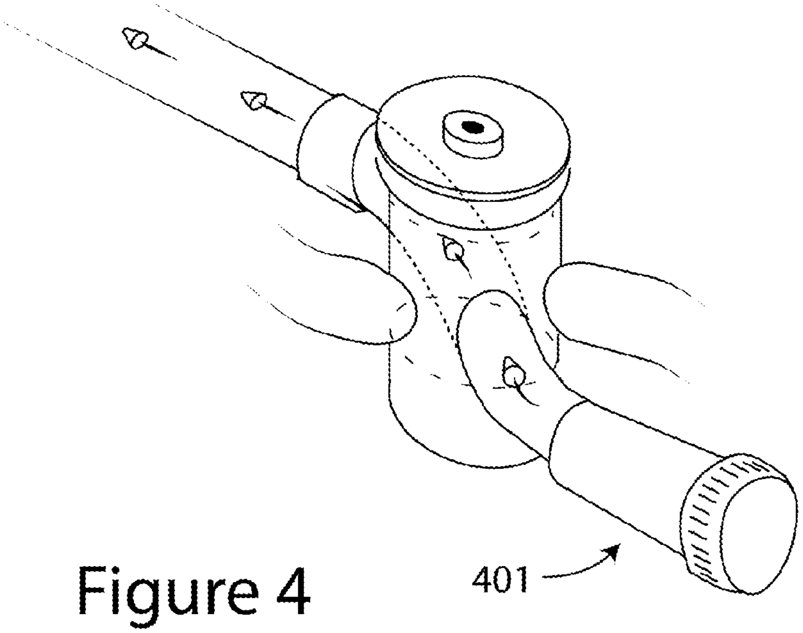
FIG. 4 is an isometric view demonstrating air flow through one embodiment of an equilibrium piston valve in a disengaged position.

FIG. 4 shows a detail of an EP Valve casing with the piston and actuation mechanics removed to demonstrate air flow in a disengaged position. Air flows through the mouthpiece/slide tube 401, then makes a slight bend prior to entering the valve. The air then flows straight through the main air passage and out of the valve. Upon exiting the valve, the air flow makes a slight bend before traveling through the bell tube and out of the trombone. The attachment tubing is not utilized in the disengaged position.

Figure 5:
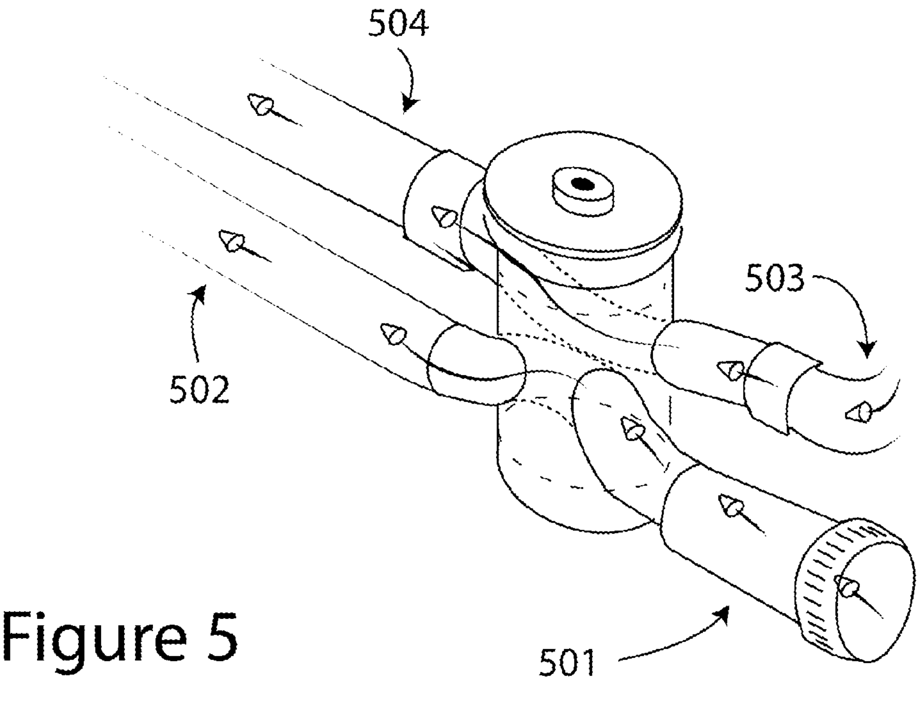
FIG. 5 is an isometric view demonstrating air flow through one embodiment of an equilibrium piston valve in an engaged position.

FIG. 5 shows a detail of an EP Valve casing with the piston and actuation mechanics removed to demonstrate air flow in an engaged position. Air flows through the mouthpiece/slide tube 501, then makes a slight bend prior to entering the valve. The air then flows through the primary attachment air passage and out of the valve. Upon exiting the valve, the air flow makes a slight bend in the attachment-out tube 502. It then travels through the entire attachment and makes a slight bend in the attachment-in tube 503 before entering the valve. The air flows through the secondary attachment air passage and out of the valve. Upon exiting the valve, the air flow makes a slight bend before traveling through the bell tube 504 and out of the trombone. The main air passage is not utilized in the engaged position.

In one embodiment, the attachment tube 102 crosses behind the rear bend of the bell tube. See FIG. 1. The crossing of the attachment tube and the bell tube facilitates the construction of a straight main air passage directly through the valve piston in the disengaged position. Equally as important, the crossing facilitates the construction of the primary and secondary attachment air passages with minimal bends in the engaged position. This overall minimization of air resistance aims to create an equilibrium between the disengaged and engaged positions, making it easier for the musician to transition between them.

Figure 6:
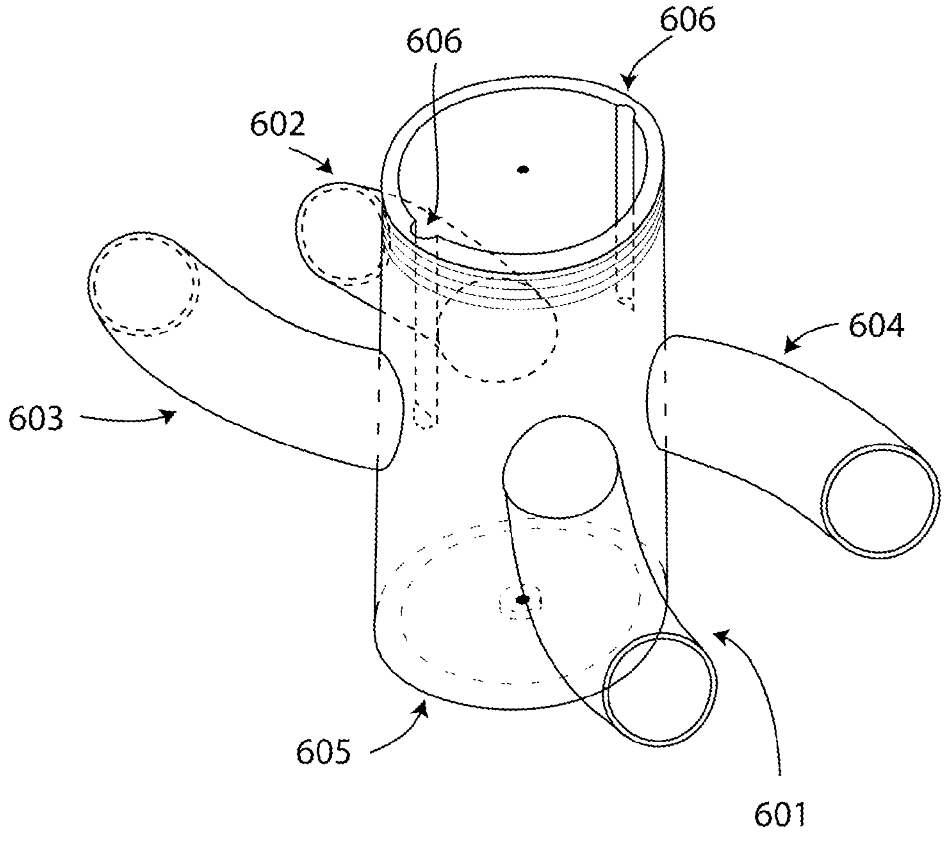
FIG. 6 is an isometric view of one embodiment of an equilibrium piston valve casing.

FIG. 6 shows a detail of one embodiment of an EP Valve casing with the mouthpiece/slide tube 601, the bell tube 602, the attachment-out tube 603, and the attachment-in tube 604. Each of the four tubes is connected to the valve casing by a port. All four ports are oriented around the perimeter of the valve casing at the same level. Also shown are the lower valve cap 605 and valve guide slots 606 for the piston. In the disengaged position, air flows only through the mouthpiece/slide tube and the bell tube. In the engaged position, air flows through all four tubes.

Figure 7:
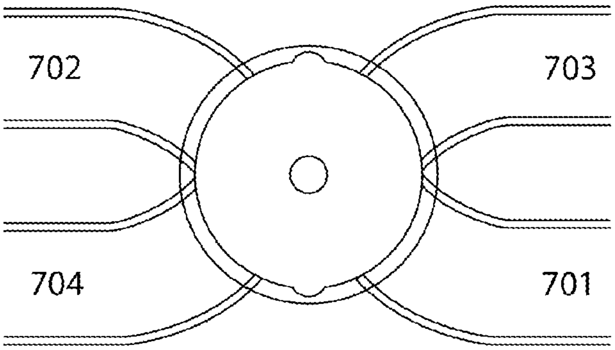
FIG. 7 is a top view of one embodiment of an equilibrium piston valve casing.

FIG. 7 is a top view of one embodiment of an EP Valve casing with all four tubes. The mouthpiece/slide tube 701 is directly across from the bell tube 702, permitting the air to flow straight through the valve with minimal resistance in the disengaged position. In one embodiment, the edges of the mouthpiece/slide tube 701 port and attachment-in tube 703 port are adjacent. Also, the edges of the attachment-out tube 704 port and bell tube 702 port are adjacent. Placing the ports right next to each other minimizes the angles required in the primary and secondary attachment air passages, limiting the air resistance necessary to utilize the attachment.

Figure 8:
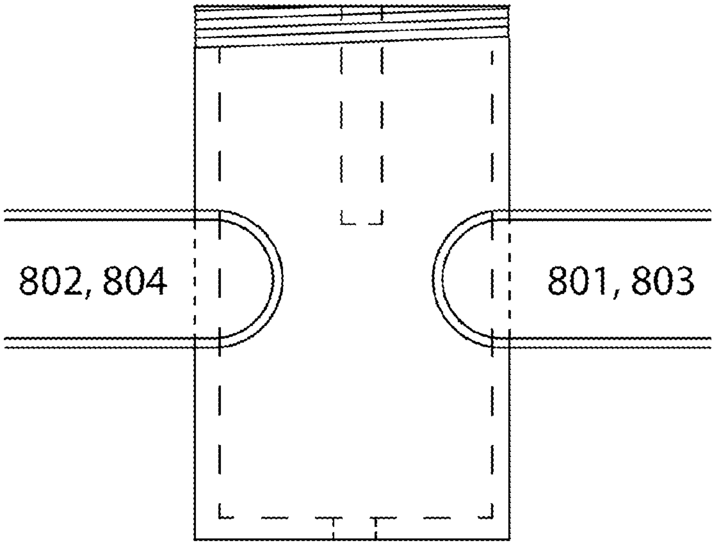
FIG. 8 is a side view of one embodiment of an equilibrium piston valve casing.

FIG. 8 is a side view of one embodiment of an EP Valve, showing all four tubes at the same level as they enter their ports around the perimeter of the valve casing. The mouthpiece/slide tube 801 is directly parallel with the attachment-in tube 803. The attachment-out tube 802 is directly parallel with the bell tube 804. A parallel arrangement enables the transition between a disengaged position utilizing the main air passage and an engaged position utilizing the primary and secondary attachment air passages, with minimal bends in the air passages for either position.

Figure 9:
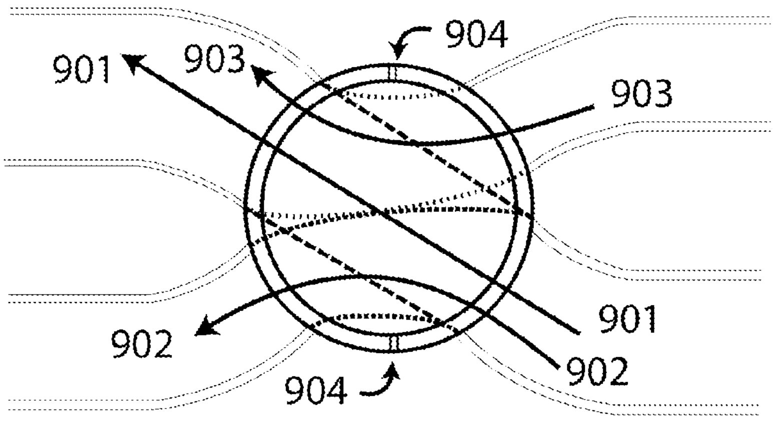
FIG. 9 is a top view of one embodiment of a piston showing engaged and disengaged sound paths.

FIG. 9 is a top view of one embodiment of the EP Valve piston. The main air passage 901 traverses straight through the piston, at a 180-degree angle. The primary 902 and secondary 903 attachment air passages are comprised of a slight bend. In one embodiment, the maximum bend for each air passage is a 155-degree angle. Valve guides 904 are positioned on the top of two sides of the piston.

Figure 10:
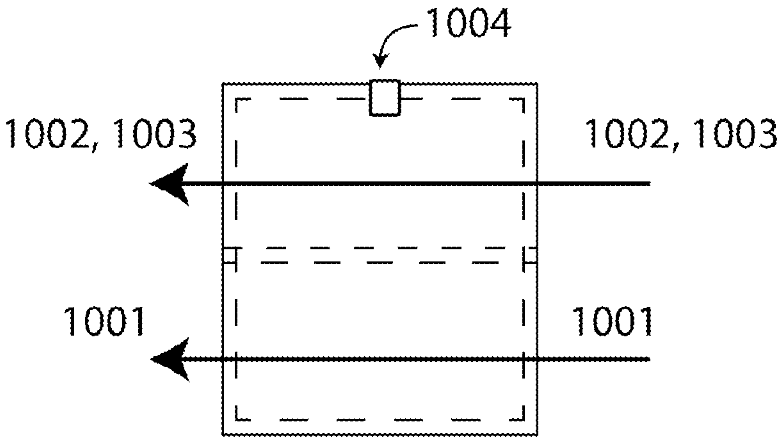
FIG. 10 is a side view of one embodiment of a piston showing engaged and disengaged sound paths.

FIG. 10 is a side view of one embodiment of the EP Valve piston, shown separated in two levels. The main air passage 1001 is utilized in the disengaged position and resides in the bottom level of the piston. The primary 1002 and secondary 1003 attachment air passages reside next to each other in the top level of the piston. Because all four ports are on the same level around the perimeter of the valve casing, the top and bottom levels of the piston require exactly the same vertical height, minimizing the overall size of the piston required. A smaller piston lowers the weight of the instrument as well as the effort to transition between disengaged and engaged positions. Valve guides 1004 are positioned at the top of two sides of the piston.

Figure 11:
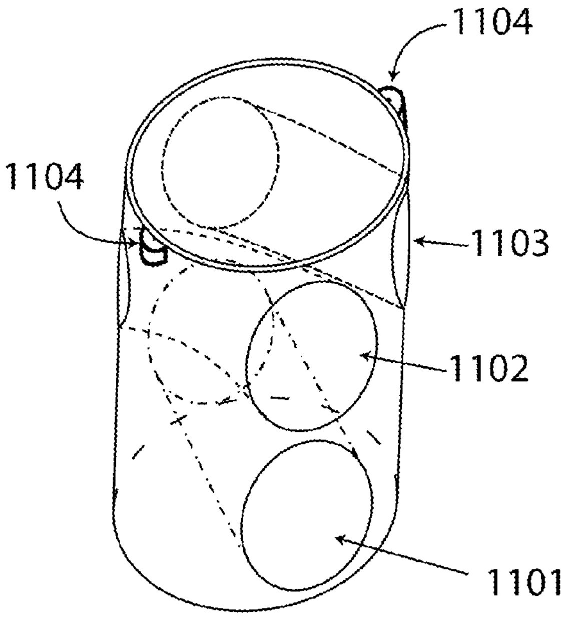
FIG. 11 is an isometric view of one embodiment of a piston showing engaged and disengaged sound paths.

FIG. 11 shows an isometric view of one embodiment of the EP Valve piston. The piston may be solid metal with hollow air passages. To save material and weight, the piston is generally hollow with hollow tube air passages brazed across the interior. The main air passage 1101 traverses straight through bottom level of the piston. The primary 1102 and secondary 1103 attachment air passages traverse through the top level of the piston with slight bends. Valve guides 1104 are positioned at the top of two sides of the piston.

While the foregoing description has been directed to specific embodiments, other variations and modifications may be made to the described embodiments, with the attainment of some or all their advantages. EP Valves may be used in combination with multiple instruments in addition to trombones, and in coordination with other valves. Accordingly, this description is only an example and does not otherwise limit the scope of the embodiments herein.

The invention claimed is:

1. A piston valve device for adjusting the length of tubing in a musical instrument, the device comprising:

a. a piston casing for holding a piston cylinder, the piston casing being comprised of four ports arranged on a port level around a perimeter of the piston casing, coinciding to four attached air tubes, wherein;
   i. a first air tube is a mouthpiece tube, connecting a mouthpiece to the piston valve;
   ii. a second air tube is an attachment-out tube, connecting the piston-valve to an attachment tube;
   iii. a third air tube is an attachment-in tube, connecting the attachment tube back to the piston valve, and
   iv. a fourth air tube is a bell tube, connecting the piston valve to a bell;

b. a piston cylinder having a height, wherein the piston cylinder is positioned within the piston casing, and the piston cylinder is comprised of three air passages, wherein;
   i. a first air passage is on a first level of the piston cylinder, a second air passage is on a second level of the piston cylinder, and a third air passage is also on the second level of the piston cylinder;
   ii. the first air passage travels straight through the piston cylinder at a 180-degree angle, connecting the mouthpiece tube to the bell tube;
   iii. the second air passage travels through the piston cylinder at a slight bend no more acute than a 155-degree angle, connecting the mouthpiece tube to the attachment-out tube; and
   iv. the third air passage travels through the piston cylinder at a slight bend no more acute than a 155-degree angle, connecting the attachment-in tube to the bell tube; and c. a means for actuating the piston between a disengaged position and an engaged position.

2. The device of claim 1, further comprised of a piston stem and a spring, wherein the piston-valve is maintained in a disengaged position by the spring on the piston stem.

3. The device of claim 1, further comprised of a lower valve cap and a spring positioned between the piston cylinder and the lower valve cap, wherein the piston-valve is maintained in a disengaged position by the spring.

4. The device of claim 1, wherein the means for actuating the piston is a button connected to a piston stem.

5. The device of claim 1, wherein the means for actuating the piston is a lever converting lateral action to vertical action of a piston stem.

6. The device of claim 1, wherein the attachment tube crosses behind the rear bend of the bell tube to facilitate a straight first air passage through the valve when not utilizing the attachment tube, and to facilitate minimal bends in the second and third air passages when utilizing the attachment tube.

7. The device of claim 1, wherein an edge of the port coinciding with the mouthpiece tube is adjacent to an edge of the port coinciding with the attachment-in tube, and an edge of the port coinciding with the attachment-out tube is adjacent to an edge of the port coinciding with the bell tube, to minimize the bends in the second air passage and the third air passage.

8. The device of claim 1 wherein the second level of the piston cylinder is directly on top of the first level of the piston cylinder, minimizing the height of the piston cylinder.

9. The device of claim 1, wherein the cross-sectional area of each of the three air passages is equal to the cross-sectional area of each of the four attached air tubes.

10. The device of claim 1, wherein the disengaged position connects the mouthpiece tube to the bell tube through the first air passage, and the engaged position connects the mouthpiece tube to the attachment-out tube though the second air passage and connects the attachment-in tube to the bell tube through the third air passage.

11. The device of claim 1, wherein the disengaged position connects the mouthpiece tube to the attachment-out tube though the second air passage and connects the attachment-in tube to the bell tube through the third air passage, and the engaged position connects the mouthpiece tube to the bell tube through the first air passage.

12. The device of claim 1, wherein the mouthpiece tube is further connected to a slide for lengthening the tube.

* * * * *